Sept. 9, 1952      C. L. KELLER      2,610,221

INDICATING VENT PLUG FOR ELECTRIC STORAGE BATTERIES

Filed March 25, 1949

INVENTOR.
CHARLES L. KELLER,
BY Allen & Allen
ATTORNEYS.

Patented Sept. 9, 1952

2,610,221

UNITED STATES PATENT OFFICE 2,610,221

INDICATING VENT PLUG FOR ELECTRIC STORAGE BATTERIES

Charles L. Keller, Winnetka, Ill., assignor to The Richardson Company, Lockland, Ohio, a corporation of Ohio Application March 25, 1949, Serial No. 83,416

5 Claims. (Cl. 136—182)

My invention has to do with the provision of vent plugs for electric storage batteries, which plugs will, without removal, indicate whether or not the electrolyte is below a predetermined level, and hence whether or not the cell of the storage battery requires the addition of water.

Various types of indicating vent plugs have hitherto been proposed which incorporate a float member for the purpose described. However, these structures have been complicated and expensive in manufacture, have involved parts or structures projecting above the normal level of the top of the vent plug so as to interfere with the use or appearance of the storage battery, or have incorporated moving parts so related as to be liable to failure due to sticking, jamming or the like.

It is an object of my invention to provide an indicating vent plug of the float type which is simple and inexpensive in construction, which can be made of the minimum number of parts, which provides a positive and readily readable indication of the electrolyte level even in dim light, and which is trouble-free and certain in operation.

These and other objects of the invention which will be set forth hereinafter or will be apparent to one skilled in the art upon reading this specification, I accomplish by that construction and arrangement of parts of which I shall now describe an exemplary embodiment. Reference is made to the accompanying drawings wherein.

Figure 1:
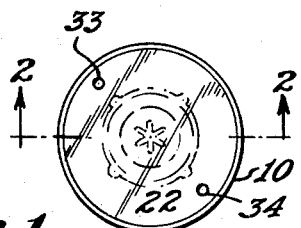
Figure 1 is a top plan view of my improved vent plug with the indicator actuated by electrolyte at normal level.

My structure comprises essentially three parts which may be separately fabricated and then combined into a unitary structure. These parts are illustrated in an exploded view in Figure 5. There is a body element having an enlarged annular top portion 10 below which there is a threaded portion 11 for engagement in the threaded opening of a storage battery cell cover. A tubular extension of substantially lesser diameter than the diameter of the threaded portion depends from it as at 12 providing a shoulder indicated at 13.

The interior of the body member is hollow as shown; but a continuation of the downward tubular extension 12 projects upwardly within the hollow body as at 14. About this upward extension there is a hollow annular space 15; and gas vent openings 16 and 17 are formed in the shoulder 13 and connecting with the hollow annular space. The downward tubular projection has a bore or central opening 18 of a desired diameter, while the upper extension of the same tubular element has a bore 19 of larger diameter, there being a shoulder 20 located between the two.

The outer surface of the portion 10 provides a grasping surface whereby the vent plug may be screwed into or unscrewed from the filler opening in the cell cover; and this outer surface may be knurled or formed into some convenient and decorative polygonal shape for more ready grasping.

The body element may be formed, by molding, of any suitable acid resistant plastic material. It is an advantage of my structure that the visibility of the signal is not dependent upon the transmission of light through the body member. Hence, while the body member may be made of transparent plastic if desired, it may also be made of opaque plastic in any color, or of such materials as hard rubber composition.

It will be noted also that a shoulder 21 is formed on the outer surface of the upwardly projecting part 14 of the tubular extension.

Figure 4:
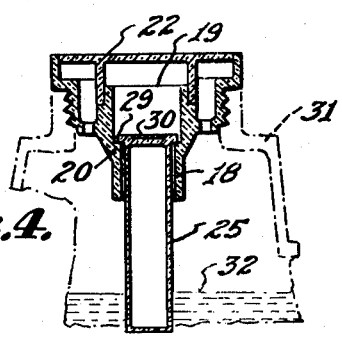
Figure 4 is a sectional view taken along the section line 4—4 of Figure 3, and showing parts of a storage battery cell cover in dotted lines.
Figure 6:
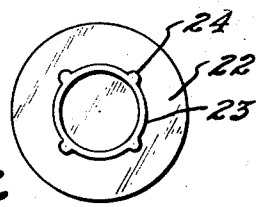
Figure 6 is a bottom plan view of the top disc member taken along the line 6—6 of Figure 5.
Figure 7:
Figure 7 is a top plan view of the float member taken along the line 7—7 of Figure 5.
Figure 5:
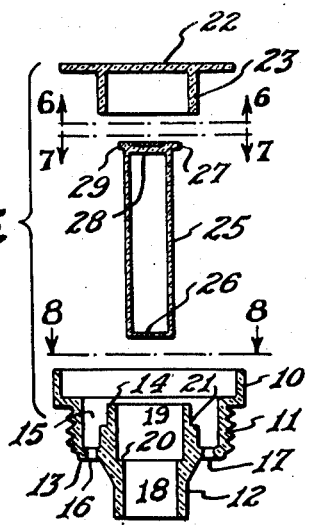
Figure 5 is an exploded view of the several parts of my indicating vent plug.
Figure 8:
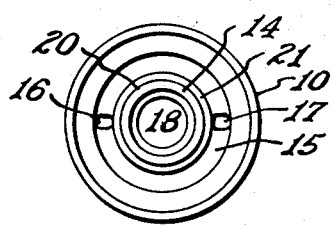
Figure 8 is a top plan view of the body element of my structure taken along the line 8—8 of Figure 5.

My structure also includes a cap member which, as indicated in Figures 5 and 6, is a molded structure comprising an upper disc element 22 of a size to fit inside the gripping portion 10 of my body element. Integral with the upper disc portion there is a downwardly depending tubular portion 23 having an internal diameter capable of fitting over the upper end of the upwardly extending tubular part 14 of the body, and coming to rest against the shoulder 21. The shoulder 21 will thus support the disc portion of the cap member substantially at the level of the top surface of the gripping portion 10 of my body, as will be evident from the assembled views, Figures 2 and 4. Since the downward tubular extension 23 of the cap member is thin, it may be reinforced, as indicated in Figure 6, by rib elements 24.

The cap element will be formed from transparent or translucent plastic since one of its functions is to afford a view of the float member hereinafter described. Any suitable acid resistant transparent or translucent plastic may be employed, and its chemical composition is not a limitation upon the invention.

The third element of my structure is a hollow substantially cylindrical body 25 constituting a float. This may be made in a variety of ways. It is within the scope of my invention to make it by cutting to the desired length a piece of acid resistant plastic tubing and fitting both ends of the tubing with plastic plugs which are cemented in place with a suitable cement for the plastic in an air-tight fashion so as to entrap air in the hollow interior of the tube. Another and preferable mode of manufacture is to form by injection molding or otherwise a cylindrical plastic body 25 having an integral bottom 26. Then a cap element 27 for the hollow cylindrical body may be formed of suitable plastic or other material by molding, stamping, cutting or the like. This cap element will have a lower portion 28 shaped to fit within the top of the hollow cylindrical body 25. Above this there will be a flange 29 of a diameter larger than the external diameter of the hollow cylindrical body. This cap element may be placed in position as shown in Figure 5, and held in place by a press fit, or by cementing, or both. An indicia element 30 of any desired shape may be incorporated in the top portion of the cap element. This may be done in various ways. A stamped element of other plastic may be incorporated in the cap element during molding, or grooves may be molded in the cap element which are then filled with a substance of contrasting color. The float element is made of acid resistant material; but it need not be transparent or translucent unless desired. The cap member of the float is preferably made of white or light colored plastic or else the indicia element is made light in color to contrast with a darker color of the cap element itself and to give proper visibility. The visual indication provided by my indicating vent plug is the appearance of the cap member of the float and its indicia adjacent the disc portion 22 of the top element of my plug.

The body 25 of the float element is made of a size to slide easily within the bore 18 of the lower depending portion of the tubular extension 12 of the body element. The periphery and size of the top portion 29 of the float, being as aforesaid, of larger diameter, is shaped to have a sliding fit in the enlarged bore 19 of the upwardly projecting portion 14 of the tubular extension of the body. This provides a double bearing for the float in its sliding movements as hereinafter more fully explained.

Figure 2:
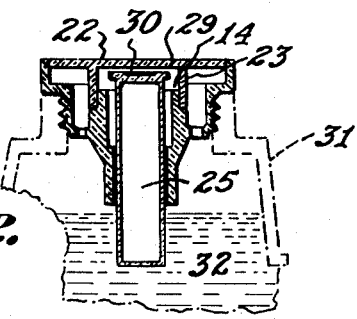
Figure 2 is a sectional view thereof taken along the section line 2—2 of Figure 1, parts of a storage battery cell cover being shown in dotted lines.

The assembly of the three essential parts of my structure will be clear from Figures 2 and 4. In these figures my vent plug structure is shown screwed into place in the vent opening of a storage battery cell cover 31. When the level of the electrolyte 32 is low, as shown in Figure 4, the cylindrical body 25 of the float occupies its lowermost position, and the enlarged flange 29 at its upper end rests against the interior shoulder 20 of the tubular extension to limit the downward motion of the float as shown. When the electrolyte is higher, it will cause the float to rise. During its rising movement the float has a double bearing to prevent cocking and sticking. Bearing is provided not only by the engagement of the tubular body 25 in the lower and smaller bore 18 of the tubular extension, but also by the engagement of the periphery of the top flange 29 of the float in the upper and larger bore 19 of the tubular extension. In its extreme upward position, as shown in Figure 2, the upper flange 29 of the float may come above the upper extension 14 of the tubular element of the body; but as soon as the level of the electrolyte 32 falls, the double bearing referred to above will become effective.

With the electrolyte in its highest position, as shown in Figure 2, the upper portion 29 of the float 25 will be located against or closely adjacent to the transparent or translucent disc portion 22 of the top element of my vent plug and will be clearly visible therethrough. When the level of the electrolyte is low as in Figure 4, the top portion 29 of the float will be substantially separated from the disc portion 22 of my vent plug, and the indicia 30 will be less visible, or in a dim light invisible. Thus a positive indication of the electrolyte level is provided so that the user of the storage battery, by glancing at its vent plug, may determine whether the various cells need filling without removing the vent plugs.

Figure 3:
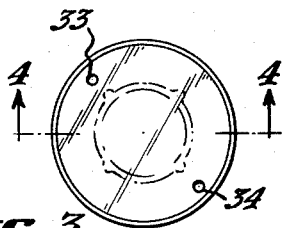
Figure 3 is a top plan view of my structure with the float in the non-indicating position.

It will be noted further that the downward tubular extension 23 of the cap or top member of my vent plug engages the upward extension 14 of the tubular element of the body and closes off a chamber in which the float operates. Gases coming off from the electrolyte during the operation of the storage battery pass through the gas vent openings 16 and 17 in the body and into the annular chamber 15. The upper disc portion of my vent plug is provided with gas vent openings 33 and 34, most clearly shown in Figures 1 and 3. These are preferably located out of alignment with the gas vent openings 16 and 17. Thus the annular space 15 may serve as a trap for electrolyte entrained in the escaping gases; and this electrolyte can run back into the cell through the openings 16 and 17. Any entrained electrolyte collecting in the annular space 15 is kept separated, as will be evident, from the chamber within the vent plug in which the float member slides; and this serves to minimize the sticking from this cause. The sliding fit of the float member in the two bores 18 and 19 is relatively loose, and will permit the escape of air or gas from the chamber in which the float slides. Nevertheless, the bearing of the body of the float element in the downward tubular extension 12 is such as to prevent enough cocking to permit the flange portion 29 of the float to engage above the upper edge of the upper tubular extension 14; or this element may be taper-bored at its top; or the element 14 may be prolonged upwardly to meet the disc portion 22.

The top or cap element of my structure may be held in place in any way desired. The disc portion 22 may have a press fit in the annulus 10 or the tubular portion 23, may have a press fit in the upper end of the upper tubular extension 14, or both, and either or both of these joints may be cemented as desired.

Modifications may be made in my invention without departing from the spirit of it. Having thus described my invention in an exemplary embodiment, what I claim as new and desire to secure by Letters Patent is:

1. In an indicating vent plug a hollow body having a portion for engagement in the filler opening of a storage battery cell cover, a downwardly depending hollow tubular part on said portion, a float journaled for axial movement in said hollow tubular part, and a cap for said hollow body formed of material pervious to light through which the upper end of said float may become visible as it approaches said cap, said tubular part being of lesser external diameter than said hollow body, leaving a shoulder therebetween, said cap and said shoulder being perforated for the venting of gas, said tubular part having an upward extension within said hollow body, and said cap having a disc portion for closing the top of said hollow body and a depending tubular extension coacting with the upward tubular extension aforementioned, closing off within said hollow body a chamber containing a portion at least of said float, the perforations in said shoulder being located outside of said closed chamber whereby the gas being vented passes around said closed chamber out of contact with said float.

2. The structure claimed in claim 1 wherein the tubular part of said hollow body has a bore for accepting said float in its downwardly extending portion and a bore of larger diameter in its upwardly extending portion, and wherein said float has an upper flange of a diameter to slide within said upper bore but larger than the diameter of said lower bore whereby said float is retained in said body.

3. The structure claimed in claim 1 wherein the tubular part of said hollow body has a bore for accepting said float in its downwardly extending portion and a bore of larger diameter in its upwardly extending portion and wherein said float has an upper flange of a diameter to slide within said upper bore but larger than the diameter of said lower bore whereby said float is retained in said body, and wherein said float has a sliding bearing as to its body in said lower bore and a sliding bearing as to its flange in said upper bore.

4. The structure claimed in claim 1 wherein the tubular part of said hollow body has a bore for accepting said float in its downwardly extending portion and a bore of larger diameter in its upwardly extending portion, and wherein said float has an upper flange of a diameter to slide within said upper bore but larger than the diameter of said lower bore whereby said float is retained in said body, and wherein said float has a sliding bearing as to its body in said lower bore and a sliding bearing as to its flange in said upper bore, and wherein said float is an elongated tubular member having closures at its upper and lower ends entrapping air within.

5. The structure claimed in claim 1 wherein the tubular part of said hollow body has a bore for accepting said float in its downwardly extending portion and a bore of larger diameter in its upwardly extending portion, and wherein said float has an upper flange of a diameter to slide within said upper bore but larger than the diameter of said lower bore whereby said float is retained in said body, and wherein said float has a sliding bearing as to its body in said lower bore and a sliding bearing as to its flange in said upper bore, and wherein said float is an elongated tubular member having closures at its upper and lower ends entrapping air within, and wherein the said upper closure is a member comprising said flange and visible indicia incorporated in said flange.

CHARLES L. KELLER.

REFERENCES CITED

The following references are of record in the file of this patent:

UNITED STATES PATENTS

| Number | Name | Date |
|---|---|---|
| 1,491,143 | Kerr | Apr. 22, 1924 |
| 1,508,829 | Woodbridge | Sept. 16, 1924 |
| 1,525,985 | Feldkamp | Feb. 10, 1925 |
| 1,703,233 | Hall et al. | Feb. 26, 1929 |
| 2,400,228 | Franz et al. | May 14, 1946 |
| 2,484,163 | Gosheff | Oct. 11, 1949 |
| 2,512,757 | Westall | June 27, 1950 |

FOREIGN PATENTS

| Number | Country | Date |
|---|---|---|
| 594,413 | Great Britain | Feb. 18, 1948 |